C. C. CARPENTER.
BATTERY PLATE ENVELOP.
APPLICATION FILED APR. 16, 1913. RENEWED MAY 8, 1919.

1,325,710.

Patented Dec. 23, 1919.
2 SHEETS—SHEET 1.

Witnesses
Robert H. Weir
R. H. Van Nest

Inventor:
Campbell C. Carpenter
Edwin B. H. Tower Jr.
Atty.

C. C. CARPENTER.
BATTERY PLATE ENVELOP.
APPLICATION FILED APR. 16, 1913. RENEWED MAY 8, 1919.
1,325,710.
Patented Dec. 23, 1919
2 SHEETS—SHEET 2.
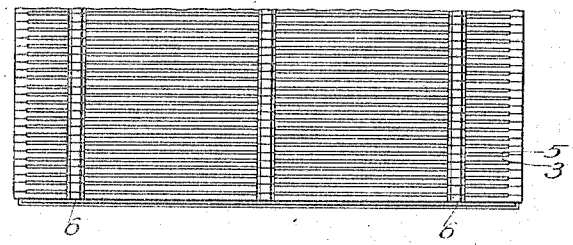
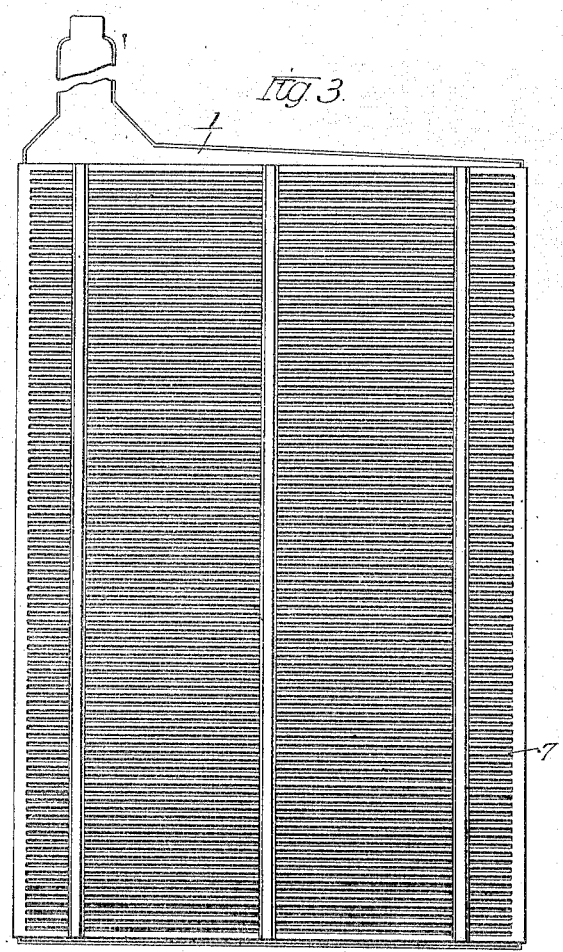
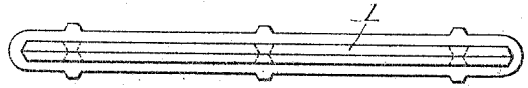

UNITED STATES PATENT OFFICE.

CAMPBELL C. CARPENTER, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

BATTERY-PLATE ENVELOP.

1,325,710.      Specification of Letters Patent.      Patented Dec. 23, 1919.

Application filed April 16, 1913, Serial No. 761,576. Renewed May 8, 1919. Serial No. 295,705.

*To all whom it may concern:*

Be it known that I, CAMPBELL C. CARPENTER, a citizen of the United States, residing at Niagara Falls, in the county of Niagara and State of New York, have invented new and useful Improvements in Battery-Plate Envelops, of which the following is a full, clear, concise, and exact description, reference being had to the accompanying drawing, forming a part of this specification.

This invention relates to improvements in battery plate envelops.

In the operation of the standard lead battery plates many difficulties have been encountered on account of the disintegration of the plates due to the shedding of the active material. Attempts have been made to provide inclosing envelops which will effectively hold the active material in place. Such envelops have been generally unsuccessful due to the fact that the protective envelop does not respond to the various movements and changes which the battery plates undergo during service.

An object of this invention is to provide an improved protective envelop for battery plates which is practically integral with the plate.

Another object of the invention is to provide an improved battery plate envelop which will effectively prevent disintegration of the plates.

Another object of the invention is to provide an improved battery plate envelop which will permit free circulation of the battery electrolyte.

Another object of the invention is to provide an improved process for forming the battery plate envelops.

A preferred embodiment of the improved envelop is illustrated in the accompanying drawings, in which:

Fig. 2 is an elevation of the lower portion of a plate illustrating a subsequent step in the process.

Fig. 3 is an elevation of a completed battery plate and its protective envelop.

Fig. 4 is a bottom edge view of the plate illustrated in Fig. 3.

Figure 1:
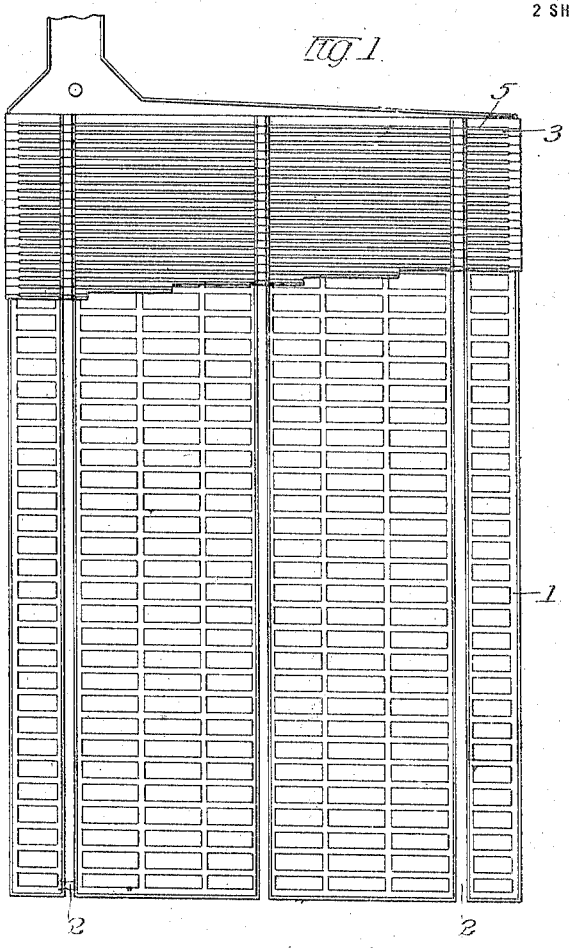
Figure 1 is an elevation of a pasted lead battery plate partially inclosed in the protective envelop, illustrating one step in the process.

Plates to which the improved protective envelop are to be applied are preferably slightly modified in the process of manufacture. Fig. 1 illustrates a pasted lead plate 1, of any preferred type, in which vertical channels 2 have been formed entirely through the plate, extending from the lower edge to a point near the upper edge thereof.

Figure 5:
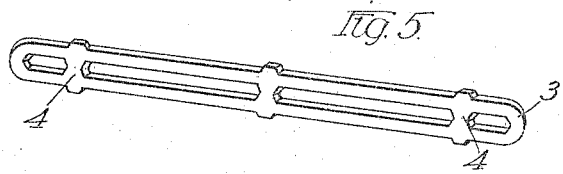
Figs. 5 and 6 illustrate details of elements employed in forming the envelop.
Figure 6:
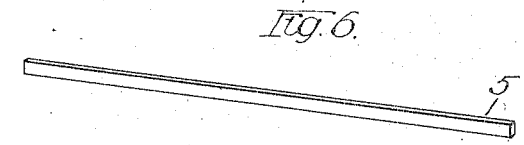

The improved envelop in the first stage of its formation comprises punchings 3 formed from thin sheets of soft rubber, illustrated in Fig. 5. The central openings in these punchings are of sufficient size to enable the punchings to be slipped over the plate with the cross pieces 4 passing through the channels 2 and holding the opposite sides of the punching snugly against the plate. A thin strip 5 of zinc, or other material which may be readily dissolved, is placed on each side of the plate between each two rubber punchings so that the plate is completely inclosed, as indicated on the upper portion of Fig. 1. The strips 5 are shorter than the rubber punchings and are only as wide as the side pieces of the rubber punchings, so that when the envelop is assembled, adjacent soft rubber pieces will come together around the ends of the zinc strips and at the cross-pieces 4, as indicated in Fig. 1. The envelop is made of sufficient thickness to extend the proper distance on either side of the plate, depending upon the space required for the separation of the plates when they are assembled in a battery jar.

After the plate has been entirely inclosed in the envelop of alternate soft rubber and zinc strips, the lower ends of the channels 2 are closed, as indicated at 6 in Fig. 2, by any suitable process, preferably by that known as lead burning.

The plate is then treated to a vulcanizing process whereby the soft rubber is hardened, thus leaving the plate at this stage inclosed in an envelop of alternate layers of hard rubber and metallic zinc.

In order to make the plate electrically active and so that there may be an even diffusion of the electrolyte, the plate is then subjected to an acid bath whereby the zinc is dissolved, thus leaving the envelop in the form of a hard rubber container provided with rectangular slits 7, as illustrated in Fig. 3.

Although in describing this embodiment of the invention reference has been made to a pasted lead plate provided with channels, it is to be understood that the improved envelop may be applied to any other type of plate and that such plates may be provided with channels or may be of standard construction without the channels.

It is apparent also that in place of the zinc, any other metal or material may be employed which will perform the functions of separating the sheets of rubber until after they are vulcanized and which may then be removed by chemical or mechanical means.

By forming the envelop of vulcanized rubber with interlocking projections fitting into the plate channels, the plate and envelop are rendered practically integral so that the active material will be held in place during the repeated charging and discharging of the plate. At the same time an envelop is provided which will not rapidly deteriorate under the action of the battery acids.

What I claim as new and desire to secure by Letters Patent of the United States is:

1. A method of protecting battery plates which consists in inclosing a plate in a laminated pile of thin sheets of soft rubber and vulcanizing the same to provide a hard rubber envelop for the plate.

2. A method of protecting battery plates which consists in inclosing the plate in an envelop of alternate thin sheets of soft rubber and a substance soluble in acid arranged in planes at right angles to the surface of the plate, vulcanizing the rubber, and treating the completed plate to an acid bath to dissolve the soluble substance.

3. A process of forming a slotted container for battery plates which consists in forming the container from a laminated pile of thin sheets of soft rubber and a spacing material, vulcanizing the same and removing the spacing material.

4. A method of protecting a battery plate which consists in slotting the battery plate, inclosing the plate in an envelop of alternate thin sheets of pliable material with portions interfitting in the slots of the plate, and a spacing material separating said sheets of pliable material, hardening the pliable material and removing the spacing material.

5. A method of protecting a battery plate which consists in slotting said plate from one edge to a point adjacent the opposite edge, inclosing said plate in alternate punchings of soft rubber having integral projections passing through said slots, and strips of readily soluble substance, closing the open ends of said slots, vulcanizing said soft rubber and dissolving said strips of soluble material.

6. A method of protecting a battery plate which consists in slotting said plate from one edge to a point adjacent the opposite edge, inclosing said plate in alternate punchings of soft rubber having integral projections passing through said slots, and strips of metallic zinc, closing the open ends of said slots, vulcanizing said soft rubber and treating said plate to an acid bath to dissolve said zinc.

7. The process of forming a slotted container for battery plates which consists in forming the container from a laminated pile of thin sheets of soft rubber and strips of metallic zinc intermediate said sheets, vulcanizing the same to harden the rubber and unite the rubber sheets around said zinc strips, and treating said container to an acid bath to dissolve the zinc.

In witness whereof I have hereunto subscribed my name in the presence of two witnesses.

CAMPBELL C. CARPENTER.

Witnesses:
D. A. ATKINS,
W. L. BLISS.